Dec. 16, 1969  R. BOURGEOIS  3,483,631
WORKPIECE POSITIONING DEVICE
Filed Sept. 3, 1968  2 Sheets-Sheet 1

INVENTOR.
RONALD BOURGEOIS
BY
*Robert T. Dunn*
ATTORNEY

United States Patent Office 3,483,631
Patented Dec. 16, 1969

3,483,631
WORKPIECE POSITIONING DEVICE
Ronald Bourgeois, 138 Ellison Park,
Waltham, Mass. 02154
Filed Sept. 3, 1968, Ser. No. 756,889
Int. Cl. G01b 5/14, 3/30, 5/20
U.S. Cl. 33—180                                    10 Claims

ABSTRACT OF THE DISCLOSURE

A device for positioning a workpiece on a surface so that the workpiece can be machined or worked including a scale which abuts at least one edge of the workpiece and slides substantially parallel to the surface in a holder which is fixetd to a plate which in turn is fixed to the surface, the plate and surface including sets of indices some of which are in registry when the plate is fixed to the surface, and the holder and plate including sets of indices some of which are in registry when the holder is fixed to the plate, whereby the angular position of the scale on the surface is selected and fixed by alignment of indices from different sets and the scale, upon sliding within the holder at the selected angle, positions the piece at measured positions along the selected angle.

---

This invention relates to devices for positioning a workpietce on a surface so that the workpiece can be worked or machined by relatively stationary apparatus for this purpose.

Sheet metal to be worked by cutting, bending or punching apparatus is positioned on a surface or work table beneath the apparatus and the apparatus is actuated to accomplish the cutting or bending. Since each cut or bend must be precisely located on the workpiece, it has been the practice in the past to attach a scale to one edge of the table at a known distance from the cutting or bending edge of the apparatus and then using this scale, measure a distance from the edge of the table to the edge of the workpiece to ascertain that the cut or bend will be properly positionetd on the workpiece.

It is one object of the present invention to provide improved apparatus for positioning the workpiece for cutting, bending or other operations at precisely determined positions along any selected angular position relative to the apparatus.

It is another object of the present invention to provide a device for positioning a workpiece along precisely measured positions along any of a number of selected directions relative to apparatus for cutting, bending or machining the workpiece.

It is another object of the present invention to provide a plurality of such workpiece positioning devices for positioning the workpiece in two dimensions relative to cutting, bending, punching or other machining apparatus.

Other objects of the present invention will be apparent from the following specific description taken in conjunction with the figures in which.

Figure 1:
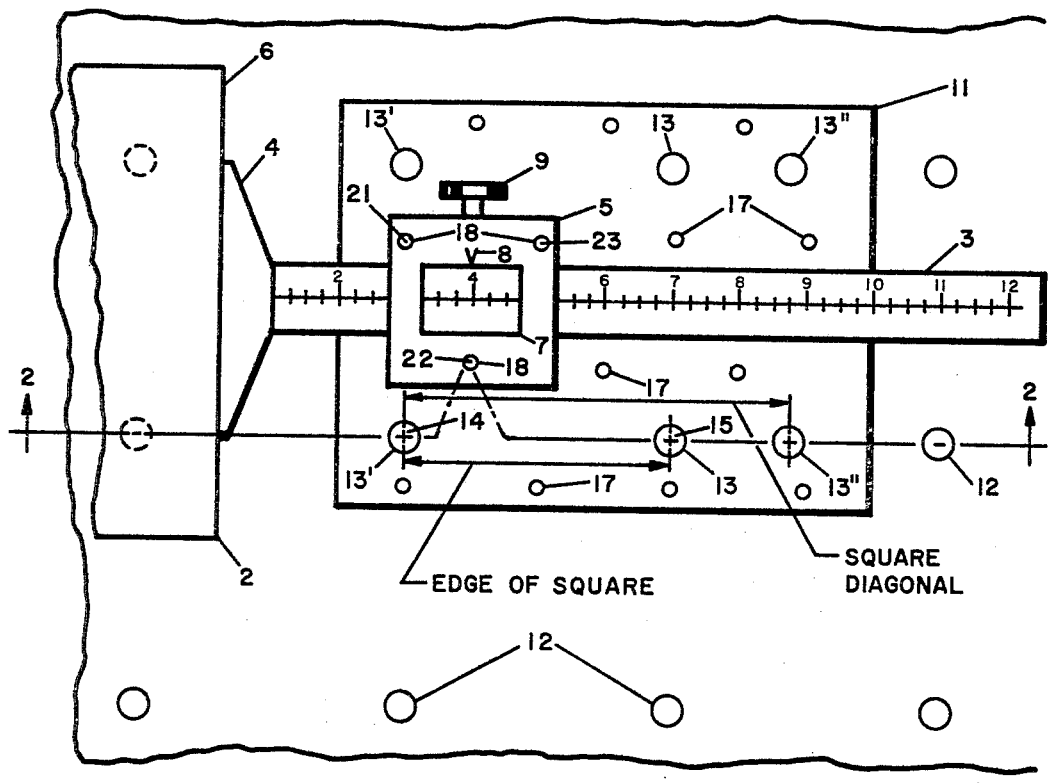
FIGURE 1 is a plan view showing the positioning device, the workpiece and the worktable or surface to illustrate cooperation therebetween.

Turning first to FIGURE 1 there is shown a workplate which may be substantially horizontal and flat on which a workpiece 2 is positioned beneath machining apparatus not shown. The machining apparatus may be any of the conventional types of apparatus for shearing, bending, punching, drilling or otherwise working the workpiece 2. Generally, the machining apparatus is at a fixed position relative to the workplate 1 and so by positioning the workpiece on the workplate beneath the apparatus, the apparatus is brought to bear at the desired selected points or areas of the workpiece. The positioning device contemplated by the present invention can be positioned at any number of selected angular positions on the workplate so as to position the workpiece at precisely measured translational positions along the selected angular position. By this technique the workpiece is oriented at selected angular and translational positions beneath the machining apparatus.

It is frequently desired to bend, cut or drill a workpiece at precise positions along an angular line crossing the workpiece. The positioning apparatus described herein abuts the edge of the workpietce so that the workpiece assumes the same angular position on the workplate as the positioning device and also includes a precise scale so that the workpiece can be positioned at precisely determined translational positions along the selected angular position.

In FIGURE 1, the positioning device includes a scale 3 with a transverse bar 4 at one end so that the bar and scale define a T. The scale is slideably held in a scale holder 5 so that the scale can slide through the holder substantially parallel to the workplate 1 with the T bar 4 abutting an edge 5 of the workpiece. A window 7 in the scale holder and an index 8 provide means for precisely measuring the distance from the edge 6 of the workpiece to the center of the scale holder 5. A thumb screw 9 on the scale holder is provided for locking the scale in the holder at a selected position.

The scale holder 5 is positioned on a positioning plate 11 and the plate 11 is positioned on the workplate 1. Thus, the angular position of the plate 11 on the workplate 1 and the angular position of the holder on the plate 11 determined the resulting angular position of the sliding scale 3 relative to the workplate 1. Since the scale T bar 4 abuts the edge 6 of the workpiece, the angular position of the scale on the workplate 1 establishes the angular position of the workpiece on the workplate and the angular position of the workpiece relative to the machining apparatus. Thereafter, the translational position of the workpiece along this angular position is precisely determined by moving the scale 3 within the holder 5 along the selected angular position. At each selected translational position of the scale, the thumb screw 9 is tightened to fix the scale in the holder and the bending, cutting or machining operation is performed on the workpiece. This process may be repeated at different translational positions along the selected angular position by simply releasing the thumb screw and moving the scale to position the workpiece. Thus, successive machining operations may be rapidly performed along a selected angular orientation of the workpiece relative to the machining apparatus.

In order to facilitate angular orientation of the scale relative to the workplate, a first set of indices is provided in the workplate 1 which may be comprised of rows and columns of relatively large holes such as the set of index holes 12. A similar set of index holes are provided in the positioning plate 11 and define a second set of holes 13. The first set of holes 12 and the second set 13 are so designed that at least two of the holes from the set 13 are in registry with at least two of the holes from set 12 at each of a number of different angular orientations of the positioning plate 11 relative to the workplate 1. When holes from the set 13 are in registry with holes from set 12, position plate pins such as 14 and 15 are inserted through the holes which are in registry, and so the plate 11 is fixed at a determined angular position on the workplate 1.

A third set of smaller index holes 17 in the plate 11 are designed to cooperate with a fourth set of index holes 18 in the holder 5. The holes in these sets 17 and 18 are preferably the same size so that when in registry, scale holder pins such as 21, 22 and 23 can be inserted into some of the holes 18 and 17, thereby affixing the angular position of the scale holder 5 relative to the plate 11. The index holes 17 and the index holes 18 are so oriented that at least two of the holes 18 are in registry with at least two of the holes 17 at each of a number of selected angular positions of the scale holder 5 relative to the plate 11, and so the scale holder 5 can be positioned at any of the selected angular positions on the plate 11 by aligning the holes and inserting the scale holder pins.

The four sets of indices represented by the sets of holes 12, 13, 17 and 18 permit orientation of the scale 3 relative to the workplate 1 at a great number of positions from 0° to 360°. More particularly, when the set of index holes 12 are disposed to define squares and at least some of the holes in the second set 13 are disposed to define an equal square and with others, such as holes 13a and 13b, separated by a distance equal to the diagonal of the square, then the positioning plate 11 can be positioned at angular increments of 45° relative to the workplate 1. This provides eight positions between 0° and 360°.

When the holes 17 in the third set of indices in the positioning plate 11 are disposed at the corners of equilateral triangles and the holes in the fourth set of indices in the scale holder 5 define the same equilateral triangle, then the scale holder 5 can be oriented on the plate 11 at 60° increments relative thereto. Thus, the holder can be oriented on the plate at six different angular positions between 0° and 360°. By combining the different orientations of the plate 11 relative to the workplate 1 and the holder 5 relative to the plate 11, the scale 3 can be positioned relative to the plate 1 at 15° increments for a total of 24 different positions between 0° and 360°. Furthermore, the angular position of the scale is securely fixed at each of these positions by the pins which fix the scale holder, position plate and workplate together.

Figure 2:
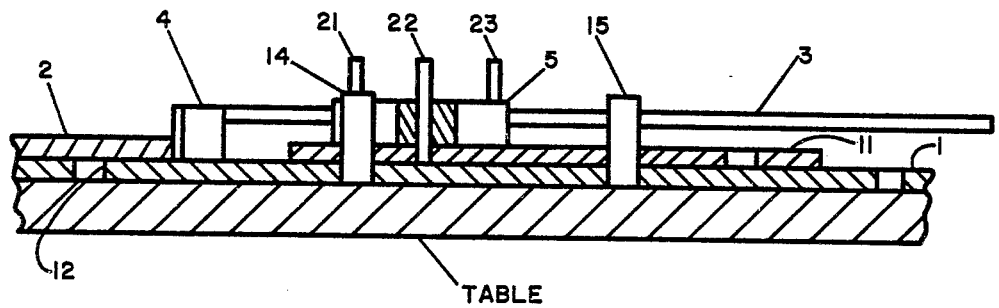
FIGURE 2 is a sectional view taken as shown in FIGURE 1.
Figure 3:
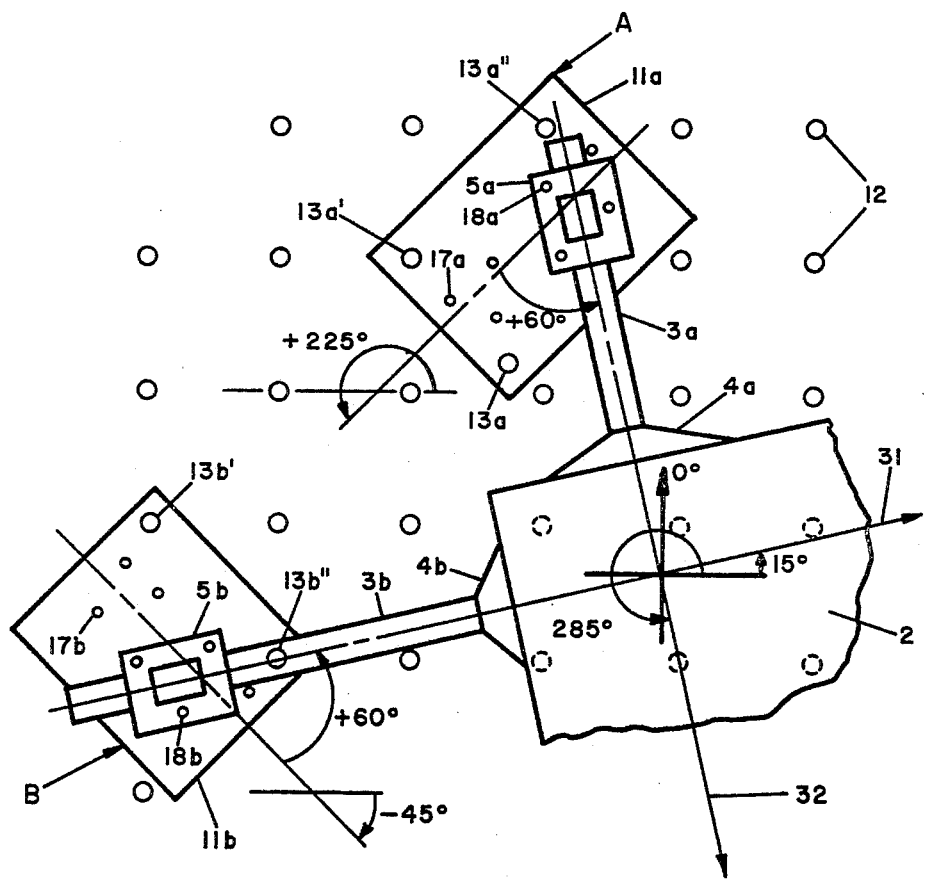
FIGURE 3 illustrates use of two positioning devices on the surface or workplate for positioning the workpiece in two dimensions thereon.

A number of positioning devices such as shown in FIGURES 1 and 2 can be employed together to position the workpiece 2 on the workplate 1 along different directions which may be orthogonal directions. Such a use is shown in FIGURE 3. The positioning devices A and B shown in FIGURE 3 are so adjusted and pinned so that their respective scales 3a and 3b, which correspond to scale 3 in FIGURES 1 and 2, are oriented angularly relative to the workplate 1 at the angles 285° and 15°, respectively. These are clearly orthogonal directions and so the scales 3a and 3b which move in these directions position the workpiece 1 along these orthogonal directions. The angular orientations of the scales 3a and 3b are represented by the vectors 31 and 32 which are in the angular directions 15° and 285° relative to the coordinates of the workplate 1. This orientation of the scale 3a is achieved by orienting its associated plate 11a at 225° relative to the workplate 1 and orienting its associated holder 5a at 60° relative to the plate 11a. The 15° orientation of the scale 3b is obtained by orienting its associated plate 11b at minus 45° relative to the workplate and orienting holder 5b at 60° relative to the plate 11b. Once the scales 3a and 3b are oriented as shown, they are then adjusted in their holders to position the workpiece 2 in two dimensions relative to the Table 1 and relative to the machining apparatus which is not shown.

This completes description of an embodiment and the use of an embodiment of the present invention. The use described herein is the best use contemplated at the present time although many other uses are possible.

What is claimed is:

1. A device for positioning a workpiece on a surface comprising:

a linear scale one end of which abuts perpendicular an edge of the workpiece, a holder in which the scale slides parallel to the surface, a plate, pin and hole means for fixing the plate to the surface at different angular orientations relative thereto, pin and hole means for fixing the holder to the plate at different angular orientations relative thereto, said pins and hole means defining sets of indices on the surface and plate some of which are in registry when the plate is fixed to the surface, and said pin and hole means defining additional sets of indices on the holder and the plate some of which are in registry when the holder and plate are fixed.

2. A device as in claim 1 and in which:
   there are four sets of indices, one on the surface, two on the plate and one on the holder.

3. A device as in claim 2 and in which:
   the set of indices on the surface cooperates only with one of the sets on the plate, and
   the set of indices on the holder cooperates with the other set on the plate.

4. A device as in claim 1 and in which:
   two of the sets of indices consist of matching holes of one size,
   the other two sets of indices consist of matching holes of another size, and
   the plate is fixed to the surface and the holder is fixed to the plate by pins inserted into the holes.

5. A device as in claim 4 and in which:
   the sets of index holes of the same one size define the same geometric figure of one kind,
   the sets of index holes of the same other size define the same geometric figure of another kind.

6. A device as in claim 5 and in which:
   the one geometric figure kind is a square and the other geometric figure kind is a triangle.

7. A device as in claim 4 and in which:
   the set of holes in the surface and a set of holes in the plate are of the same one size, and the other two sets of holes are of the same other size.

8. A device as in claim 7 and in which:
   the one size is larger than the other size.

9. A device as in claim 7 and in which:
   some of the pins fit the holes of one size and
   other pins fit the holes of the other size for pinning the holder, the plate and the surface together.

10. A device as in claim 9 and in which:
    the sets of indices consisting of holes of one size are arranged in the plate and surface to define equal squares and diagonals of the square, and
    the sets of indices consisting of holes of the other size are arranged in the plate and holder to define equal equilateral triangles,
    whereby the holder can be pinned to the plate at different angular positions and the plate can be pinned to the surface at other different angular positions, thereby positioning the scale and the workpiece relative to the surface at any of a number of selected angular positions.

References Cited

UNITED STATES PATENTS

| | | |
|---|---|---|
| 2,404,858 | 7/1946 | McLaren. |
| 2,941,303 | 6/1960 | Middlestadt. |
| 3,371,423 | 3/1968 | Paul. |
| 3,407,506 | 10/1968 | Karstens. |

WILLIAM D. MARTIN, Jr., Primary Examiner

U.S. Cl. X.R.

33—75, 174